Feb. 14, 1961 A. B. JOHNSON 2,971,735
FISHING ROD HOLDER
Filed Sept. 9, 1958
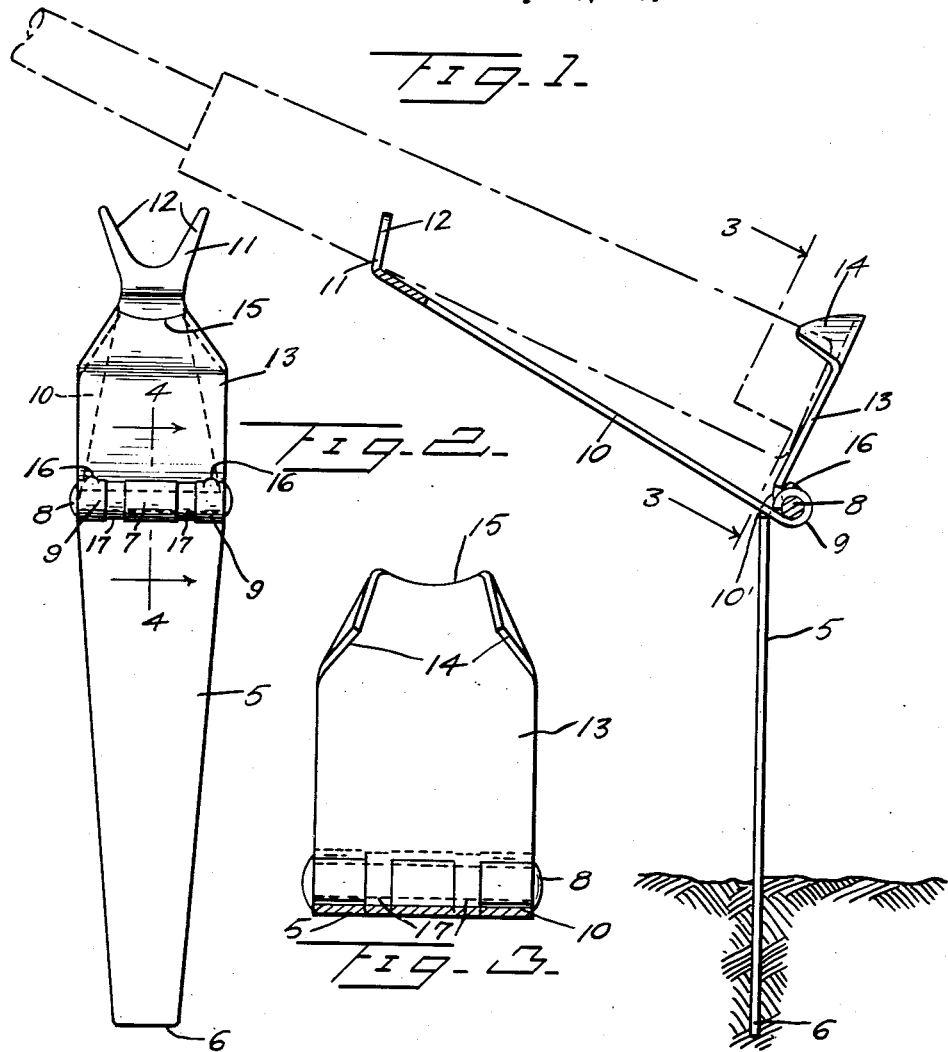
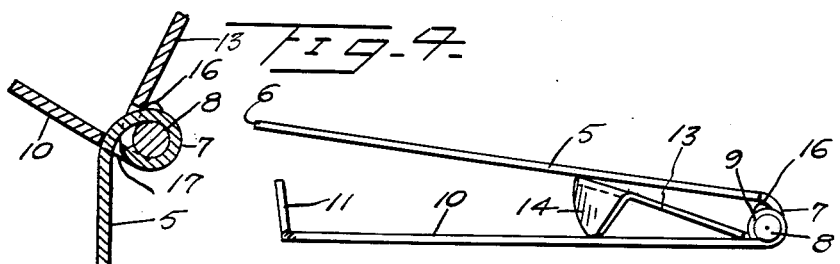
A.B. Johnson
INVENTOR
BY C.A. Snow & Co.
ATTORNEYS.

United States Patent Office 2,971,735
Patented Feb. 14, 1961

2,971,735
FISHING ROD HOLDER
Allen B. Johnson, 917 S. Maple, McPherson, Kans.
Filed Sept. 9, 1958, Ser. No. 759,873
1 Claim. (Cl. 248—46)

This invention relates to fishing rod holders, the primary object of the invention being to provide a foldable fishing rod support for supporting a fishing rod during fishing, and while a baited fishing line is attached thereto.

An important object of the invention is to provide a fishing rod holder or support which will securely hold the fishing rod in position against becoming displaced from the holder due to a pulling force being directed thereto, incident to a fish making a strike in an attempt to remove the bait from the fish hook.

Another object of the invention is to provide a holder of this character wherein the fishing rod may be readily removed from the holder in the event that it becomes necessary for the fisherman to manually maneuver the fishing rod to land the fish caught on the fish hook attached to the line.

Still another object of the invention is to provide a holder or support which may be folded into a small and compact article to facilitate the storing or carrying of the holder in the conventional fishing tackle box.

With the foregoing and other objects in view, which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is an elevational view of a holder constructed in accordance with the invention illustrating a fishing rod as supported thereby.

Fig. 2 is a front elevational view thereof.

Fig. 3 is a sectional view taken on line 3—3 of Fig. 1.

Fig. 4 is a sectional view taken on line 4—4 of Fig. 2.

Fig. 5 is a side edge elevational view of the holder or support folded.

Referring to the drawing in detail, the holder comprises a main section 5 which is substantially wide at one end thereof, the side edges of the main section tapering towards a narrow end 6 so that the main section may be readily forced into the ground surface to support the holder in an upright position.

The wide end of the supporting section 5 is constructed to provide a strap 7 on the opposite sides of the longitudinal center line thereof, said strap 7 being curved providing a hinge section to receive a pivot bolt 8.

Hinge members 9 form a part of the supporting arm 10 to accommodate the bolt 8, pivotally connecting the main section 5 and supporting arm 10, the pivotal connection between the section 5 and supporting arm 10, permitting the section 5 and arm 10 to be folded in one direction to a position, as shown by Fig. 5 of the drawing, so that the fishing rod holder may be conveniently stored or carried in the conventional fishing tackle box.

It will also be seen that the pivotal connection between arm 10 and main section 5 provides a shoulder 10′ on the under side of the strap 7, against which the arm 10 rests and is held in its proper supporting position.

As better shown by Fig. 2 of the drawing, the outer or free end 11 of the arm 10 is bent upwardly and bifurcated at 12 to receive the conventional fishing rod which is positioned therein when the holder is in use.

Cooperating with the supporting arm 10, there is a plate 13 which at its lower edge has loops 17—17 adapted to fit between the strap 7 and the hinge members 9—9 and receive the pivot. This plate 13 is of substantially rectangular formation, with the outer corners 14 thereof bent upwardly and slightly inwardly to fit over the butt end of a fishing rod handle, as shown by Fig. 1 of the drawing. The free end of the plate between the corners 14 is curved at 15 to conform to the rounded contour of a fishing rod handle.

Lugs 16 are formed on the hinge members 9—9 of the supporting arm 10 and provide stops to be engaged by the plate 13 when swung to an upright position thereby securing the plate in its active or upright position.

As shown more clearly by Fig. 1 of the drawing, the plate 13 is of a length substantially greater than the end 11 of the supporting arm 10, so that when a fishing rod is positioned in the holder as indicated by Fig. 1 of the drawing, the weight of the fishing rod will cause the latter to tilt downwardly resulting in the handle of the fishing rod binding between the points of contact with the end 11 of arm 10 and the laterally extended corners 14 of the plate 13. The result is that a pull on the rod caused by a fish attempting to obtain the bait on the hook will be directed downwardly and the fishing rod, as shown in dotted lines in Fig. 1, will be securely gripped by the holder. It will also be obvious that by lifting the fishing rod from a point beyond the outer end of the arm 10, the rod may be readily released from the holder, should it be desired to manually manipulate the rod in landing a fish.

From the foregoing it will be seen that, due to the construction of the holder as shown and described, I have provided a fishing rod holder which will securely hold a fishing rod without the use of clamping means, such as screw clamps or the like, commonly used in securing fishing rod holders, wherein the fishing rods cannot be quickly released for normal control of same, as required in landing a fish caught on the hook secured to the line attached to the fishing rod.

What is claimed is:

A fishing rod holder comprising a wide main section tapered towards one end, adapted to be driven into a supporting surface, the other end of said main section forming an offset hinge member providing a shoulder, a pivot bolt on which said hinge member is mounted, a fishing rod supporting arm, one end of said rod supporting arm being upturned and bifurcated providing a fishing rod rest, the other end thereof being hingedly mounted on said pivot bolt, said supporting arm resting on said shoulder normally holding said supporting arm in an inclined supporting position with respect to said main section, lugs extending from the hingedly mounted end of said rod supporting arm, a substantially short plate hingedly mounted on said bolt, adapted to pivot laterally resting against said lugs, normally holding said plate in a position at right angles to said rod supporting arm, and said plate having forwardly extended corners under which the handle of a fishing rod is held against accidental displacement.

References Cited in the file of this patent

UNITED STATES PATENTS

| | | |
|---|---|---|
| 2,317,445 | Davidson et al. | Apr. 27, 1943 |
| 2,841,272 | Williams | Sept. 6, 1949 |

FOREIGN PATENTS

| | | |
|---|---|---|
| 163,884 | Great Britain | June 2, 1921 |
| 210,922 | Great Britain | Feb. 14, 1924 |